United States Patent [19]
St. John

[11] 3,938,981
[45] Feb. 17, 1976

[54] METHOD FOR REMOVING GASEOUS INCLUSIONS FROM MOLTEN GLASS

[75] Inventor: Douglas F. St. John, Toledo, Ohio
[73] Assignee: Owens-Illinois, Inc., Toledo, Ohio
[22] Filed: Oct. 29, 1974
[21] Appl. No.: 518,362

[52] U.S. Cl. ..................... 65/134; 65/178; 65/347; 65/346; 55/36; 55/159; 55/203
[51] Int. Cl.² .......................................... C03B 5/14
[58] Field of Search ............ 65/134, 135, 136, 178, 65/347, 346; 55/36, 158, 203, 159

[56] References Cited
UNITED STATES PATENTS
3,754,886   8/1973   Richards et al. ..................... 65/134

*Primary Examiner*—Arthur D. Kellogg
*Attorney, Agent, or Firm*—D. T. Innis; E. J. Holler; M. E. Click

[57] ABSTRACT

A method of removing undesirable gaseous inclusions also known as seeds and bubbles, from seed containing unrefined molten glass by introducing this unrefined molten glass into a rapidly rotating contained glass mass, subjecting the unrefined molten glass mass to centrifugal forces substantially greater than gravity and developing static pressure differences in the glass mass resulting in pressure gradients in the molten glass and causing the gaseous inclusions to migrate to areas of lower static pressure and to the atmosphere from the molten glass. The introduced stream of unrefined molten glass is directed by a plurality of diverters into many paths, downwardly and outwardly toward the chamber wall, to provide a favorable force on the entrapped inclusions to increase both number and sizes of inclusions removed from the molten glass, and delivering refined molten glass from the contained glass mass, having reduced numbers and sizes of gaseous inclusions.

3 Claims, 4 Drawing Figures

METHOD FOR REMOVING GASEOUS INCLUSIONS FROM MOLTEN GLASS

The apparatus is a container for holding molten glass. The container is mounted for rotation about a central, usually vertical axis. The apparatus comprises a rotatable cylinder having a number of layers of insulating materials leaving a chamber for holding molten glass and a plurality of diverting devices including a cone-shaped configuration positioned in a stacked arrangement from near the top opening in the chamber to near the discharge opening in the container. The diverters are supported about their edges by a plurality of notched ribs positioned to rest upon the bottom of chamber and means for rotating the cylinder about an axis.

BACKGROUND OF THE INVENTION

1. Field of the Invention

This relates to apparatus and a method for removing gaseous inclusions from molten glass by subjecting the molten glass to centrifugal forces, establishing pressure gradients within the molten glass and causes the gaseous inclusions to move from the glass to the atmosphere.

2. Description of the Prior Art

Removing gaseous inclusions is known as refining. One method of refining is to mix and melt glassmaking material in the same or continuous chambers, and subject these materials to continued heating to remove gaseous inclusions. Glass is made in this prior art way by melting glass forming sand and stabilizing oxides at high temperatures in a refractory lined tank to form molten glass. Sand and the other glass forming constituents materials are accurately proportioned to yield glass of the desired composition mixed so that the materials will be homogeneous and these batch materials are heated to a sufficiently high temperature until the batch becomes a molten glass mass.

U.S. Pat. No. 3,754,886 issued Aug. 28, 1973 to Richards et al disclosed a successful method of removing undesirable gaseous inclusions by rapidly rotating a contained glass mass, subjecting this unrefined molten glass to centrifugal forces greater than gravity and developing static pressure gradients in the molten glass and causing the gaseous inclusions to migrate to areas of lower static pressure and to the atmosphere from the molten glass. This invention is an improvement to that method of removing gaseous inclusions, especially in removing gaseous inclusions in a size range of about 0.001–0.003 inches.

SUMMARY OF THE INVENTION

This invention relates to a method and apparatus for refining molten glass by introducing unrefined molten glass i.e., glass that has a high gaseous inclusion count into a chamber, rotating a confined mass of such glass to produce an essentially paraboloidal void therein caused by the rotation of the molten glass, to establish areas of higher pressure and areas of lower pressure which result in pressure gradients within the rotating glass mass and thereby causing the gaseous inclusions to travel from areas of high static pressure to areas of lower static pressure and then from the molten glass to the void, diverting the introduced downward flowing molten glass along a plurality of paths between diverting devices into areas of higher centrifugal forces causing smaller sized inclusions to move against the downward flowing glass causing these gaseous inclusions to move to the paraboloidal void and continually withdrawing molten glass having reduced members of and a changed distribution of gaseous inclusion sizes. The molten glass is diverted into a plurality of paths which put the molten glass into areas of high centrifugal force; thus subjecting more molten glass per unit of residence time to areas of high centrifugal forces in its passage through the rotating chamber and also providing an increase in the number of gaseous inclusions removed.

This invention is an improvement of the refining process disclosed in U.S. Pat. No. 3,754,886, thus increasing the number of gaseous inclusions which are removed from any unit mass of glass during a defined time interval and also increasing the number of gaseous inclusions of sizes ranging smaller than 0.001–0.003 inches in diameter which are removed from the molten glass during the refining. The apparatus comprises a chamber, mounted for rotation about a nearly vertical axis, and insulating liners and means for lubricating the apparatus. A plurality of truncated cone-shaped diverters are positioned from adjacent the entry of the container to near the discharge of the container so as to divert the molten glass stream from direct flow through the container.

The apparatus of this invention removes gaseous inclusions rapidly compared with prior art glass bath refining which required up to 36 hours. The residence time to remove gaseous inclusions is reduced to within an hour and usually within an average residence time of 15 minutes or less for a retained mass of glass in the chamber.

The process of this invention reduces the distance which the gaseous inclusion must travel to reach the surface of the paraboloidal void and increases the time that the gaseous inclusions are subjected to the maximum forces of the centrifugal field.

GENERAL DESCRIPTION OF THE INVENTION

To practice the method of this invention, glassmaking materials are mixed and melted to produce an unrefined molten glass, i.e., a glass having a high number of gaseous inclusions. This unrefined molten glass is introduced into the upper end of the continuously rotating refining apparatus. The chamber must contain a sufficient amount of glass so as to produce a paraboloidal void in the glass when the chamber and mass of glass are rotated. Continuous rotation of the centrifugal apparatus about its axis subjects the mass of glass in the chamber to centrifugal force driving gaseous inclusions toward the void in the glass mass. A plurality of diverting devices positioned in the chamber direct the entering downward flowing glass stream toward the chamber wall at an angle from the horizontal. The molten glass flowing between the diverters has a velocity profile which is reduced in areas near the surface of the diverter, permitting the buoyant force and a component of centrifugal forces on the gaseous inclusions to drive the inclusion along the diverter devices and toward the void.

The distance from an end of a diverter device to the void is short. The parabolic void diameter is controlled to maintain the void in close proximity to the ends of the diverter plates.

Figure 1:
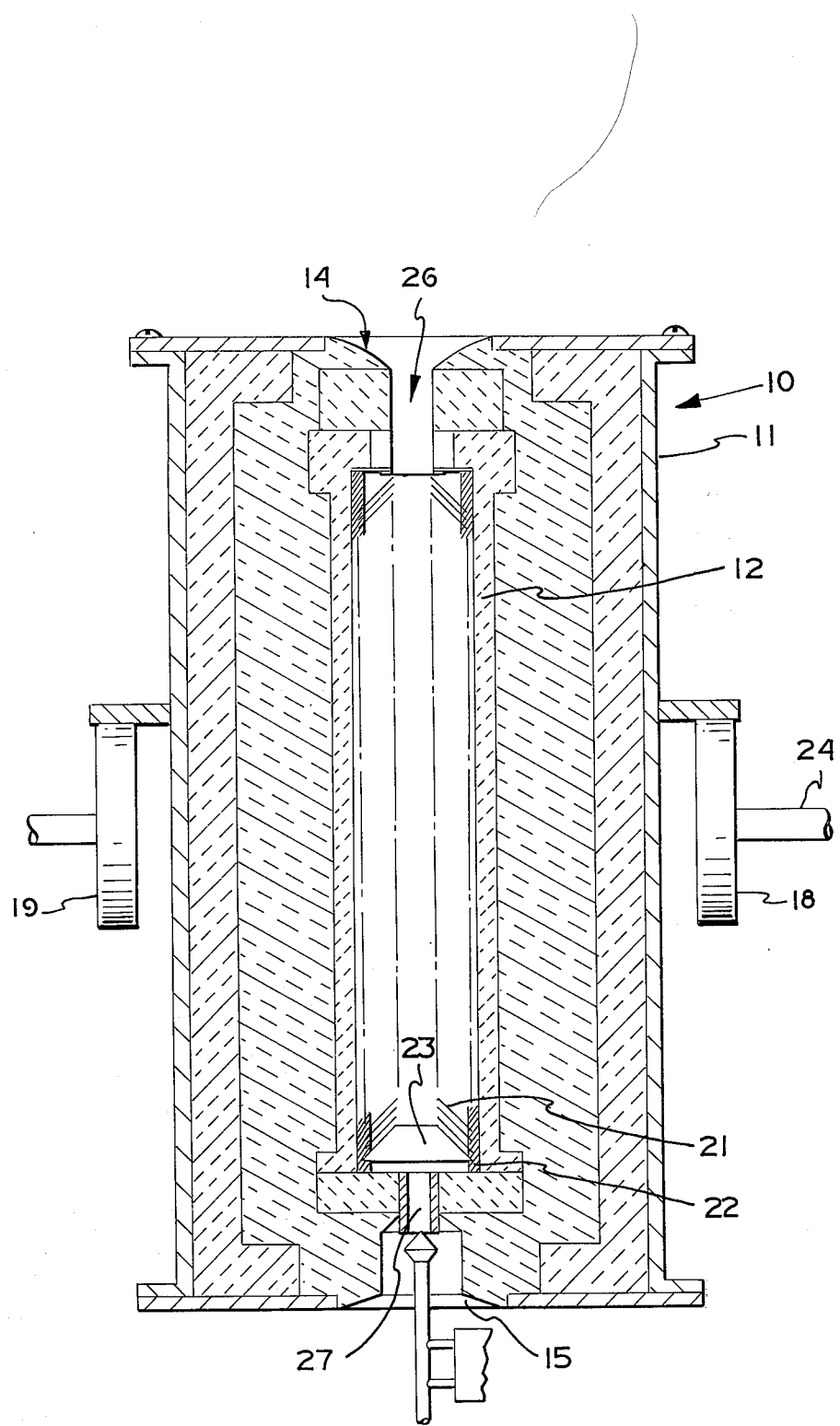
FIG. 1 is a cross-section of the apparatus of one embodiment of this invention showing a rotatable container and diverter devices.

Molten glass, having reduced number of gaseous inclusions, is removed from the lower end of the chamber at a rate substantially corresponding to the rate at which the unrefined molten glass is introduced into the chamber. Referring to FIG. 1, it shows an apparatus for practicing the method of this invention. The apparatus comprises container 10 and includes cylinder 11 and layers of refractory material 12 positioned within the cylinder to form a chamber for holding molten glass. The container is mounted for rotation about its vertical axis. The axis of rotation may be tilted away from the vertical over range toward the horizontal, but the axis of rotation is preferably more vertical than horizontal. The container has an inlet section 14 and a discharge section 15. The inlet is centered in the top of the container. The discharge 15 is centered in the bottom of the container. The inlet 14 has a narrow opening 26.

A plurality of diverting devices 21 are positioned at an angle to the vertical extending from near the inlet to near the discharge of the container. Diverting structure 23 is positioned on the bottom of the chamber, adjacent to, but not blocking the discharge, to block direct access by the discharged molten glass through the discharge channel 27, to prevent glass flowing through the center of the chamber.

Figure 2:
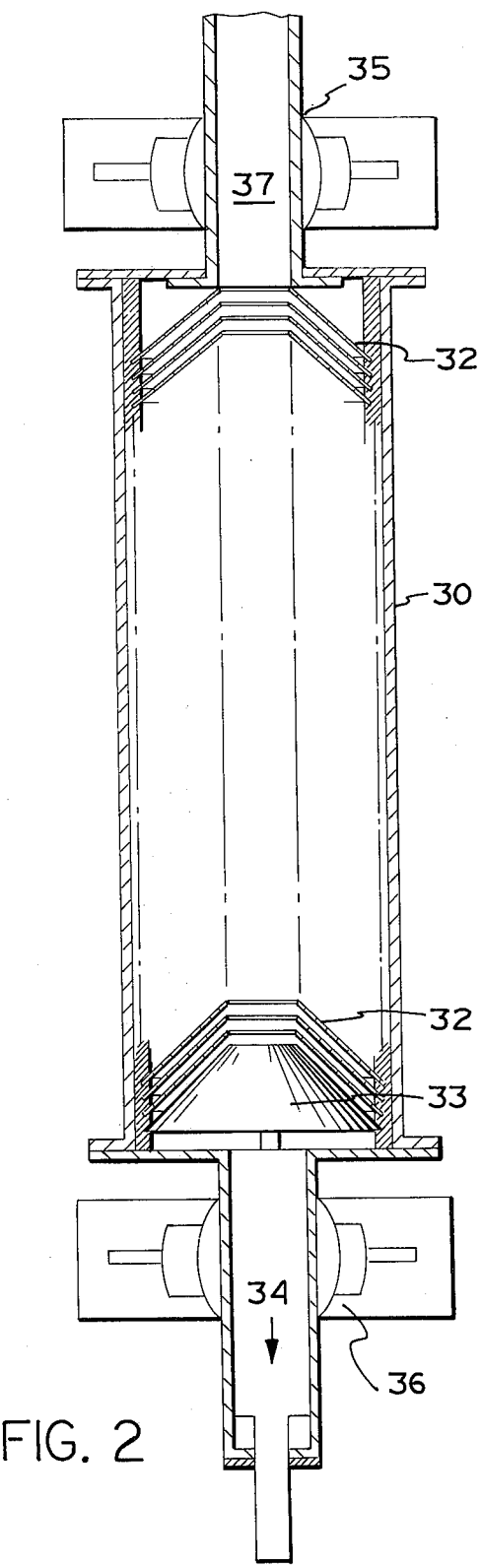
FIG. 2 is a cross-section of the apparatus of another embodiment of this invention showing a rotatable container and diverter devices.

FIG. 2 shows another apparatus for practicing this invention. Cylinder 30 holds molten glass; a plurality of diverting devices 32 are positioned in the chamber. The container is supported by top bearing structure 35 and bottom bearing structure 36 and is rotatable about its central vertical axis or may be tilted from the vertical.

The path of any gaseous inclusion in molten glass is a vector resultant force composed of several forces acting on the gaseous inclusion in a rotating mass of glass. Forces include the downward velocity of the flowing molten glass, the upward buoyancy of the gaseous inclusion due to the Stokes-Law rise, and a component of centrifugal force directing the gaseous inclusion from an area of higher static pressure to an area of lower pressure. In the prior art process of centrifugally refining glass, many smaller size gaseous inclusions and some larger size gaseous inclusions were subjected to a vector resultant force which was insufficient to remove them from the molten glass during any given residence time.

Figure 3:
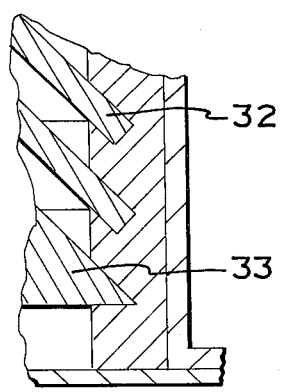
FIG. 3 is an enlarged section sideview of the diverting devices and supporting structure the apparatus of FIG. 2.

FIG. 3 is an enlarged, sectional side view of one pair of diverter devices of the apparatus of FIG. 2.

Figure 4:
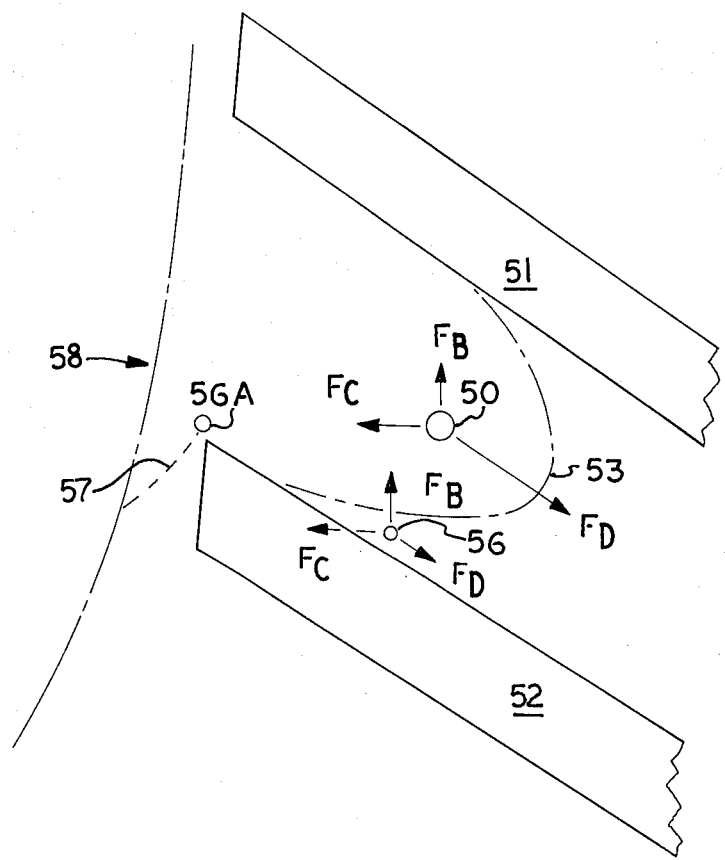
FIG. 4 is a diagrammatic representation showing an altered velocity profile of the downward flowing stream between two diverter devices.

FIG. 4 is a diagrammatic representation of a sectional view of a pair of diverter devices. Molten glass flows downward between the plates. The velocity profile of the flowing stream of molten glass is shown by broken line 53. Gaseous inclusion 50 is shown between diverter devices 51 and 52. The lowest velocity of the downward flowing stream is adjacent to the surface of the diverter devices 51 and 52. The path of movement of a gaseous inclusion is a vector resultant force which includes the drag of the downward flowing molten glass, the component of centrifugal force tending to drive the inclusion toward the central axis and the Stokes-Law buoyant force of the inclusion. The vector resultant of these forces determines the path of any gaseous inclusion within the molten glass.

For example, the gaseous inclusion designated 50 (FIG. 4) shows three forces acting on the inclusion. Drag force is designated by vector $F_D$; the vector line $F_D$ is longer relative to the force $F_C$ acting on the inclusion. A second gaseous inclusion 56 (FIG. 4) is shown in a position adjacent to the surface of diverter device 52. The decreased velocity of the molten glass near the surface of the diverter results in a decreased drag force on the gaseous inclusion hence the downward and outward flowing molten glass has a reduced effect on the path of travel. The component of force $F_D$ on gaseous inclusion 56 is now smaller than that component acting on gaseous inclusion 50. Now the resultant vector force is sufficient to move gaseous inclusion 56 upward and inwardly along the surface of the diverter 52 toward the void to position 56A, adjacent the void interface.

The diameter of the paraboloidal void is controlled by the volume of molten glass in the chamber, the speed of the rotation of the container, the rate of addition of molten glass and the rate of withdrawal from the chamber, to maintain the void interface a short distance from the ends of the diverter devices, as shown in FIG. 4. The positioning of the interface of the void provides a short path of travel for gaseous inclusions. The path of travel from the end of the diverter usually terminates in the paraboloidal void. The plurality of short travel paths to the void results in an improved efficiency in removing gaseous inclusions when contrasted with the prior art method of centrifuging molten glass.

The diverter devices are positioned at an angle from the horizontal and vertical axis of the container. It has been discovered that the most efficient operation of the method occurs when the angle from the horizontal is about 30° to 60°. The discharge of the chamber is blocked by a diverting device 33 to ensure that the downward flowing molten glass travels between the diverting devices and does not go directly from the inlet to the discharge. Thus, it is possible to provide a number of paths having areas of lower downward velocity or drag permitting smaller gaseous inclusions to travel a generally upward and inward path between the diverters, and when at the edge of the diverter, to be within travel distance of the void. The step of altering the velocity profile of the downward stream by confining the mass of flowing glass alters the vector resultant force on gaseous inclusions in the stream in a favorable manner so that gaseous inclusions move in an area of lowered downward velocity. This favorable altering of the vector resultant forces on the gaseous inclusions provides a method of moving inclusions toward the void. Gaseous inclusions of smaller sizes are now moved toward the void as contrasted with the prior art. The method comprises splitting the introduced stream of molten glass entering the chamber into a plurality of flow streams confining the flow streams and thereby controlling the velocity profile to create a profile providing a reduced velocity toward the confines of a flow of paths and thereby altering the vector resultant force acting on the gaseous inclusions, thus causing more inclusions to move up the stream of the confined path, and positioning the gaseous inclusion closer to the parabolic void, when the inclusion is released from the confined path it has a relatively short path of travel to reach the void.

Depth and diameter of the void are determined by the amount of glass in the chamber and the speed of rotation in the glass mass. For most efficient operation, the bottom of the void should not extend into the discharge of the chamber. The molten glass in the chamber also must have a sufficient head of pressure to ensure that glass flows from the chamber during rotation. The manipulation of the factors referred ensures that the interface of the void is kept within the optimum distance adjacent to the ends of the diverter devices. The shorter the path of travel from the diverter to the void the greater the number of gaseous inclusions travelling to the void.

This invention provides increased refining efficiency contrasted with prior art centrifugal refining methods. A great number of small-sized gaseous inclusions are removed from any mass of glass per unit of glass residence time in the rotating chamber.

I claim:

1. The method of refining molten glass which comprises:
   a. defining a chamber having an axis of rotation and having a restricted top and bottom forming a top opening and a bottom discharge respectively;
   b. introducing a stream of molten glass into said chamber, said stream of molten glass having substantially all glassmaking constituents in a molten state and containing undesirable entrapped gaseous inclusion;
   c. continuing to introduce molten glass so as to provide a mass of molten glass in the chamber;
   d. rotating said chamber about its axis and thereby rotating the enclosed mass of molten glass so as to subject at least portions of the mass of glass in the chamber to centrifugal forces;
   e. controlling the speed of the rotation of the chamber and the amount of glass in the chamber such that a paraboloidal void is formed in the mass of glass;
   f. diverting substantially all of the downwardly flowing molten glass into a plurality of confined downwardly and outwardly directed flow paths;
   g. each path defining a velocity profile in which the velocity of portions of the downwardly diverted flowing molten glass is decreased thereby;
   h. causing the gaseous inclusions to travel against the direction of the downwardly and outwardly flowing molten glass, inwardly and upwardly in the confined flow paths and into the void;
   i. maintaining the volume of the mass of glass in the chamber substantially constant; and
   j. removing refined molten glass from the discharge of the chamber.

2. The method of refining molten glass which comprises:
   a. introducing a stream of molten glass having gaseous inclusions into a rotating container until a paraboloidal void is formed in a mass of said molten glass;
   b. continuing to rotate said container about its axis to subject the mass of glass to centrifugal force;
   c. diverting the introduced stream of molten glass into a plurality of confined flow paths so as to control the velocity profile of the stream thus permitting the resultant force of at least some smaller-sized gaseous inclusions to carry the inclusions to the void upward and inward in areas of reduced downward velocity in said flow paths;
   d. withdrawing refined molten glass from the rotating mass of glass in the container; and
   e. maintaining the mass of glass in the chamber almost constant so as to maintain a paraboloidal void of a constant diameter.

3. The method of refining molten glass which comprises:
   a. defining a chamber having an axis of rotation and which has a restricted lower end forming a discharge;
   b. substantially continuously introducing a stream of molten glass into said chamber wherein substantially all the glass constituents are molten and which contains entrapped gaseous inclusions, providing a mass of molten glass in the chamber;
   c. rotating said chamber about its axis to subject portions of the mass of glass in the chamber to centrifugal force;
   d. controlling the configuration of the chamber, the speed of rotation of the chamber, and the amount of glass in the chamber such that at least a portion of the mass of glass in the chamber forms a paraboloidal void;
   e. causing the introduced stream of molten glass to flow downward and toward the discharge;
   f. diverting the downward-flowing stream of molten glass into a plurality of confined flow paths formed between plural diverting devices positioned within the chamber;
   g. altering the velocity profile of each plural path to provide a reduced velocity in portions of the downward flowing molten glass thus causing gaseous inclusion to travel upwardly and inwardly along the confined flow path into the paraboloidal void; and
   h. substantially continuously removing refined molten glass from the lower end of the chamber to maintain said mass of glass in said chamber substantially constant, said removed molten glass having a reduced number of gaseous inclusions.

* * * * *